United States Patent [19]

Detweiler

[11] 4,258,611

[45] Mar. 31, 1981

[54] VACUUM MOTOR FOR CARBURETORS

[75] Inventor: Charles A. Detweiler, Durand, Mich.

[73] Assignee: Schmelzer Corporation, Durand, Mich.

[21] Appl. No.: 38,403

[22] Filed: May 14, 1979

Related U.S. Application Data

[62] Division of Ser. No. 951,179, Oct. 13, 1978.

[51] Int. Cl.³ .................... F16J 1/10

[52] U.S. Cl. .................... 92/84; 92/113

[58] Field of Search .................... 92/84, 113; 261/39 B

[56] References Cited

U.S. PATENT DOCUMENTS

| | | | |
|---|---|---|---|
| 1,706,812 | 3/1929 | Pfau | 92/84 X |
| 1,736,048 | 11/1929 | Neikirk et al. | 92/113 X |
| 2,105,494 | 1/1938 | Palmer | 92/113 |
| 2,371,815 | 3/1945 | Fitch | 92/84 |
| 2,593,604 | 4/1952 | Price | 92/84 |
| 2,646,781 | 7/1953 | Doyen | 92/84 X |
| 3,773,023 | 11/1973 | Taylor | 261/39 B |
| 3,878,769 | 4/1975 | Farmer | 92/113 |

*Primary Examiner*—Irwin C. Cohen
*Attorney, Agent, or Firm*—Fisher, Gerhardt, Crampton & Groh

[57] ABSTRACT

A control motor of the type used to control carburetor choke valves wherein the motor has an output member acted on by a pair of springs, one of which is effective to urge the choke valve towards its closed position when the engine is not operating and the other of which resiliently resists opening movement of the choke valve.

8 Claims, 7 Drawing Figures

VACUUM MOTOR FOR CARBURETORS

This is a division of application Ser. No. 951,179, filed Oct. 13, 1978.

This invention relates to fluid pressure motors and particularly to control motors used for controlling the function of carburetors.

Control motors operated by vacuum are used with carburetors of internal combustion engines for the purpose of at least partially opening the carburetor choke after the engine is started and such motors are often referred to as vacuum breaks. In addition to performing this basic function the operating characteristics of such motors are varied to accomplish various type of performance. By way of example, some vacuum break motors are arranged to provide a biasing spring force in addition to the force of the usual bimetal choke control to urge the carburetor choke plate to its fully closed position. Such arrangements known as choke assist systems are used to improve engine starting particularly at high ambient temperatures where the force of the bimetal control is least effective and may not be sufficient to close the choke plate. Another function typically carried out by still other forms of vacuum break devices is know as modulated control. In such devices the vacuum break is resiliently connected to the choke linkage in such a manner that the force of the vacuum break tending to open the choke is balanced against the force of the bimetal choke control which operates as a function of temperature and tends to close the choke. As a result, during the initial starting period, such arrangements make it possible to supply an air fuel mixture in proportion to ambient temperature.

In the past the choke assisting function and the modulated choke function have been provided by separate vacuum break devices.

It is an object of the present invention to provide a fluid pressure motor such as a vacuum break in which both the choke closing function and the temperature proportioned modulating controls are achieved with a single device.

Another object of the invention is to provide a fluid motor of the vacuum break type for controlling carburetors in which either a choke assisting function or a modulating function can be provided by easy modification of the device.

The objects of the invention are accomplished by a control motor for a carburetor of the type which has a choke valve and a temperature responsive member operatively connected to the choke valve to urge the valve towards its closed position with a force inversely proportional to temperature. The motor is connected to the choke valve and incorporates an output assembly connected to a movable wall which is responsive to differential pressure such as vacuum when the engine is started to move from a rest position toward a choke opening position. The movable wall has an output assembly incorporating a carriage member and an output member which in one embodiment is acted on by a pair of springs, one of which is operative to urge the valve to a choke closed position and a second spring which is operative to resiliently resist opening of the choke upon movement of the movable wall from its rest position when the engine is started. In another embodiment a single spring is used to perform both functions.

These and other objects of the invention will be apparent from the following description and from the drawings in which.

Figure 1:
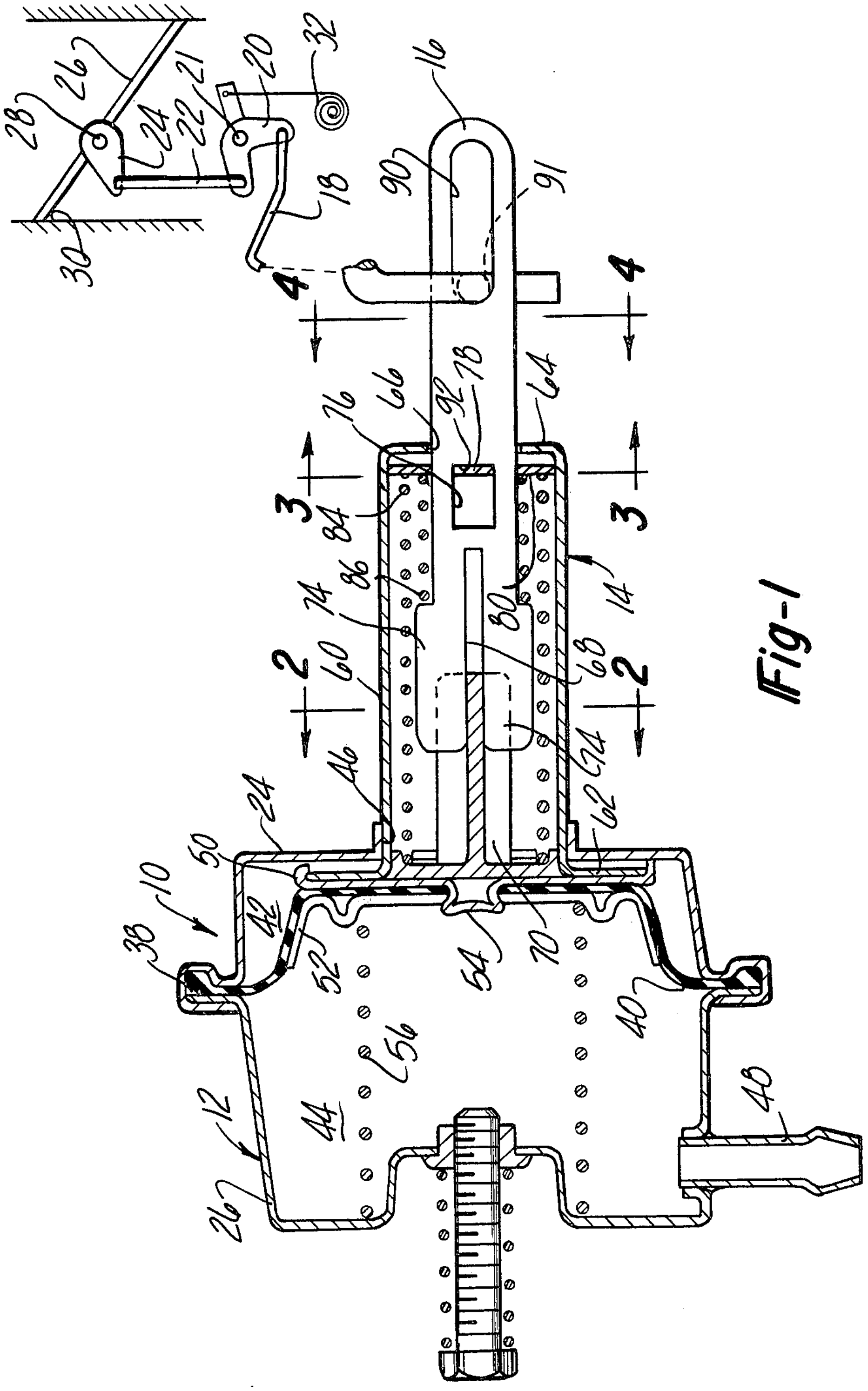
FIG. 1 is a cross sectional view of a fluid motor shown in association with carburetor controls illustrated diagrammatically.

A control motor embodying the invention is designated generally at 10 and includes a housing 12 and an output assembly 14 movable relative to the housing 12. The output assembly includes an output member or stem 16 which is connected through link 18, bellcrank 20 and link 22 to a choke control arm 24. The arm 24 is connected to a choke plate 26 by way of a shaft 28 about which the choke plate 26 can be rotated. The choke plate 26 is mounted in an air induction passage 30 of a carburetor of an internal combustion engine. The choke plate 26 is normally urged towards the closed position illustrated in FIG. 1, particularly at low ambient temperatures by a bimetal choke control 32 connected to the shaft 21 and urging the shaft and attached bellcrank 20 in a counterclockwise direction as viewed in FIG. 1. The motor 10 acts through the output member 16 to assist the bimetal choke control 32 to hold the choke plate 26 in its closed position when the engine is not operating and acts to move the choke plate 26 toward an open position against the action of the bimetal choke control 32 after the engine has started.

The housing 12 of the motor 10 includes a front cover 34 and a rear cover 36 clamped together to hold the flange 38 of the diaphragm 40 which acts to divide the interior of the housing 12 into a front chamber 42 and a rear chamber 44. The front chamber 42 is in constant communication with atmospheric air through a large opening 46 in the front cover 34 in which the output assembly 14 moves. The rear chamber 44 is connected by means of an inlet tube 48 with a source of vacuum such as the intake manifold of an internal combustion engine which is not shown.

Opposite sides of the diaphragm 40 are provided with backing plates 50 and 52 which are clamped relative to the diaphragm 40 by means of the upset head portion 54. A spring 56 acts between the rear plate 52 and interior wall of the rear cover 36 to urge the diaphragm 40 with the plates 50 and 52 to the right as viewed in FIG. 1 in which position the front plate 50 engages an interior wall of the front cover 34.

Figure 4:
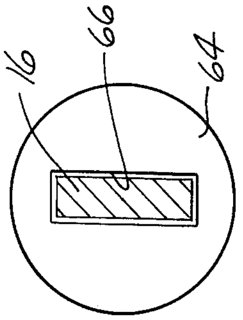
FIG. 4 is a cross sectional view taken on line 4—4 in FIG. 1.

The front plate 50 supports the output assembly 14 which includes a carriage member 60. The carriage member 60 has a radially extending flange 62 at one end which is fastened to the front plate 50 and the other end is provided with a wall 64 having a slot 66 in which the output member or stem 16 is free to slide as best seen in FIG. 4.

Figure 2:
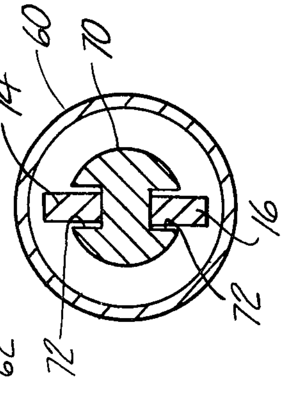
FIG. 2 is a cross sectional view taken on line 2—2 in FIG. 1.

An intermediate portion of the elongated stem 16 is supported in the slot 66 relative to the carriage member and the other end of the stem 16 is provided with a guide slot 68 which is slidably received by a guide element 70 mounted in the interior of the carriage member 60. As best seen in FIG. 2, guide member 70 is provided with slots 72 which receive a pair of tines 74 of the forked end of the output member 16. The grooves 72 act with the tines 74 to guide the forked end of the output member 16 and prevent its rotation in the carriage member 60.

Figure 3:
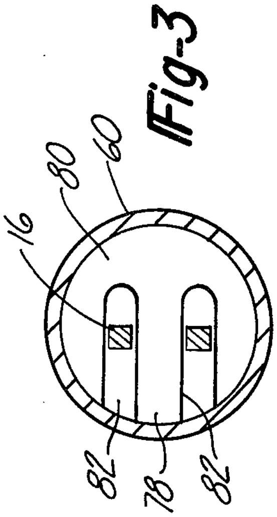
FIG. 3 is a cross sectional view taken on line 3—3 in FIG. 1.

An intermediate portion of the output member 16 has an opening 76 which receives the tongue 78 of a seat element 80 which is best seen in FIG. 3. The seat element 80 is generally circular to conform to the tubular interior of the carriage member 60 and has a pair of slots 82 which receive the opposite edges of the output member 16 and also act to form the tongue 78.

A choke assist spring 84 is disposed within the carriage member 60 and has one of its ends acting against guide member 70 and its other end acting against the seat element 80 to urge it toward the right as viewed in FIG. 1 and toward engagement with wall 64. Disposed within the choke assist spring 84 is the forked end of the output member 16 as well as a modulating spring 86. The modulating spring 86 acts between the seat element 80 and a shoulder 88 at the forked end of the output member 16.

In the position seen in FIG. 1 the seat element 80 is spaced slightly from the wall 64 due to the linkage which is dimensioned such that the choke plate is completely closed in this position. The link 18 is connected to the output member 16 by way of a slot 90 which receives a hook portion 91 on the link 18 and forms a lost motion connection. Biasing of link 18 to the left engages the left end of the slot 90 and urges the output member 16 to the left so that it engages the tongue 78 or seat element 80 and moves it away from the wall 64.

During such movement, the modulating spring 86 has no effect since it acts between the seat element 80 and the shoulder 88 and moves with output member 16. Any tendency to move the link or stem 16 to the left is solely against the action of the choke assist spring 84. In the illustrated condition, choke assist spring 84 tends to urge the seat element 80 and therefore the output member 16 to the right and the left end of the slot 90 pushes against the link 18 tending to move the latter to the right. This rotates the bellcrank 20 and moves the choke plate 26 in a counterclockwise direction about its shaft 28 to urge the choke plate 26 into its fully closed position.

Figure 5:
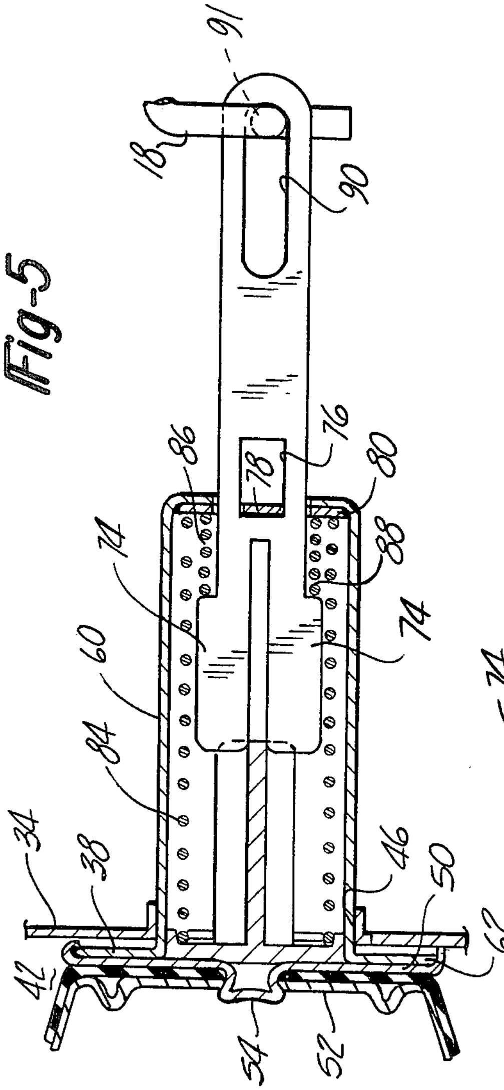
FIG. 5 is a view of a portion of FIG. 1 showing another operating position.

As soon as the internal combustion engine with which the carburetor and choke plate 26 are associated is started, vacuum pressure is established in the rear chamber 44 of the housing 12 so that a differential pressure is created across the diaphragm 40. Due to the atmospheric pressure in the forward chamber 42 and vacuum pressure in the rear chamber 44, the diaphragm assembly is moved to the left against the action of the spring 56. This causes movement of the carriage member 60 and the output member 16 to the left which pulls the left end of the lost motion slot 90 away from the link 18 permitting the seat element 80 to move to the right against the wall 64 of the carriage member 60. Eventually the right end of the slot 90 comes into engagement with link 18 as best seen in FIG. 5 and tends to pull the link 18 to the left. If resistance to movement is encountered, the modulating spring 86 is compressed. Such resistance is determined by the torque exerted on the choke shaft 28 by the bimetal choke control member 32 and by aerodynamic forces acting on the choke plate 26.

The movement of the output member 16 and the link 18 to the left causes the choke to be moved toward an open position against the resistance of the bimetal choke control 32 to control the carburetor fuel to air ratio after starting. The degree of opening is dependent on the ambient temperature which is established in the control system by way of the bimetal choke control 32. In conventional vacuum break devices without modulation, the degree of movement upon engine starting is always to a fixed position in contrast to the present system in which the open position varies and is dependent on the ambient temperature.

The movable wall formed by the diaphragm assembly is maintained to the left in the housing 12 against the biasing action of spring 56 so long as vacuum is maintained in the chamber 44 which is the case when the internal combustion engine with which the carburetor and controls are associated is running. When operation of the engine is stopped, air is admitted to the chamber 44 causing pressures to equalize across the diaphragm 40 so that the spring 56 returns the carriage 60 to the right to its rest position as shown in FIG. 1. During such movement the modulating spring 86 moves the seat element against right end 92 of the opening 76 after which the modulating spring and output member 16 can move as a unit. However, the choke assist spring 84 continues to bias the seat element 80 to the right together with the output member 16 to bring the left end of slot 90 into engagement with link 18 and thereby urge the choke 26 to its closed position.

It will be apparent that if the motor 10 is to be operated to perform only the choke assist function that the modulating spring 86 can be eliminated and the seat element 80 fastened to the output member 16 to move therewith. On the other hand, if the motor 10 is to perform only the modulating function, the operation can be accomplished by omitting the choke assist spring 84.

Figure 6:
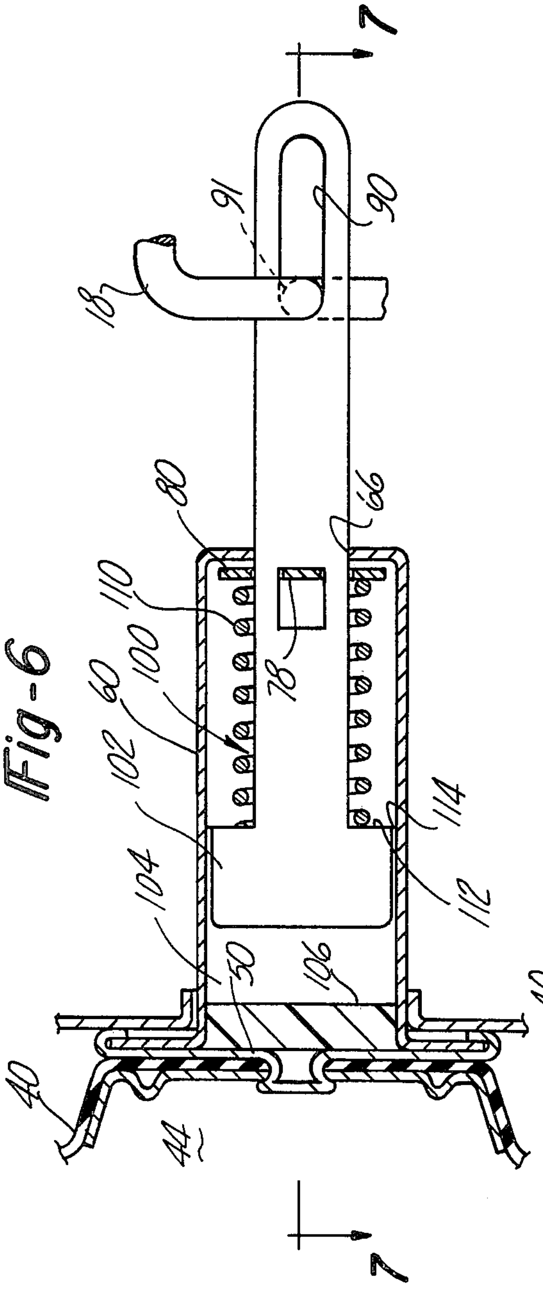
FIG. 6 is a view similar to FIG. 5 showing another embodiment of the invention.
Figure 7:
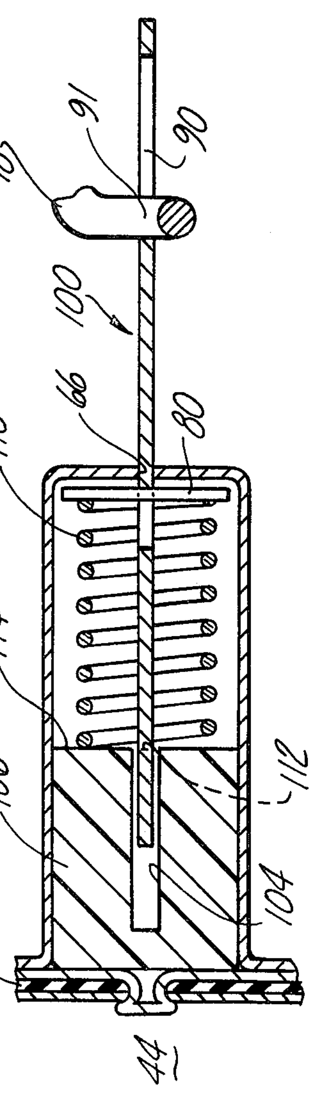
FIG. 7 is a cross sectional view taken on line 7—7 in FIG. 6.

The embodiment of the invention described thus far employs separate springs for the choke assist function and the modulating function. As a consequence when the load requirements of these two functions are different, springs of different values can be used. Referring now to FIGS. 6 and 7, another embodiment of the invention is disclosed in which a single spring is employed for both the choke assist function and the modulating function. This arrangement is suitable for use when the load requirement of the two separate functions are substantially equal.

Referring to FIG. 6, the carriage member 60 slidably supports an output member or stem 100 which is made of flat material and has an elongated T-shape with the head 102 of the T engaged with the inner walls of the carriage member to guide the stem member. The head 102 of the output member 100 also is guided in a slot 104 of a guide element 106 mounted within the carriage member 60 and seated against the plate 50 at the end of the carriage member 60. An intermediate portion of the output member 100 is slidably supported in the slot 66 in the end of the carriage member 60.

The output member 100 has an opening 108 which receives the tongue 78 on the seat element 80 which is also used in the prior disclosed embodiment. A single coiled, compression spring 110 has one end seated against the seat member 80 and in the position shown in the drawings the other end of the spring is simultaneously seated against a surface 112 forming part of the T shaped head member and a wall surface 114 of the guide element.

It will be noted that the motion of the output member 100 in either direction relative to the carriage member 60 is resisted by the spring 110. As a consequence, when the link 18 is at the left end of the slot 90, the spring 110 performs the choke assist function by urging the link 18 towards the right and urges the choke 30 towards its closed position as described in connection with the prior embodiment. On the other hand, when the movable wall including the diaphragm 40 has moved to the left in response to establishment of vacuum pressure in the chamber 44, the right end of slot 90 will engage link 18 and if the load on link 18 is sufficient the spring 110 will be compressed between the T-shaped head 102 and the seat member 80 to perform the modulating function as described in connection with the earlier disclosed embodiment.

A vacuum responsive motor has been provided which is particularly adapted for control in the choke valve of a carburetor of an internal combustion engine wherein the choke valve is controlled by a temperature responsive member and is urged towards a closed position with a force inversely proportional to temperature. The vacuum motor has an output assembly including a carriage member and a relatively movable output member which is connected by linkage to the carburetor such that in one embodiment of the invention, a first spring acts on the output member to urge the choke towards a closed position and assist the temperature responsive member when the engine is not operating and a second spring acts on the output member to resiliently resist movement of the output member relative to said carriage during movement of the latter in a choke opening direction. In another embodiment, a single spring is used to accomplish both the choke assist and modulating functions. As a result a single output member under the influence of either a single spring or a pair of springs performs a choke assist was well as a modulating function which is in a ratio to the ambient temperature.

The embodiments of the invention in which an exclusive property or privilege is claimed are defined as follows:

1. A control motor comprising: a housing, a pressure responsive wall supported in said housing and forming chambers at opposite sides, means to vary the pressure in said chambers to move said wall from a first position to a second position, an output assembly including a carriage member connected to said wall for movement therewith, an output member supported by said carriage member for movement relative thereto, a seat member positioned in said carriage member, means forming a lost motion connection between said seat member and said output member for limited movement of said seat member relative to said output member, said seat member being movable between first and second positions relative to said carriage member and normally being disposed between said first and second positions of said seat member, first biasing means acting between said seat member and carriage member to resist movement of said output member in one direction relative to said carriage member, second biasing means acting between said seat member and said output member to resist movement of said output member in an opposite direction.

2. The combination of claim 1 wherein said first and second biasing means is a pair of springs respectively operating independently of each other with a first spring disposed between said seat member and said carriage member and a second spring disposed between said seat member and said output member.

3. The combination of claim 2 wherein said second spring and output member move as a unit during movement of said output member in opposition to said first spring.

4. The combination of claim 2 wherein said seat member is movable out of engagement with said output member in opposition to said second spring upon movement of said wall toward said second position.

5. The combination of claim 2 wherein said first and second springs are coil springs disposed coaxially with each other.

6. The combination of claim 2 wherein said second spring is a coil spring coiled around said output member and wherein said first spring is a coil spring coiled around said second spring.

7. The combination of claim 1 and further comprising a control link, a lost motion connection between said output member and said control link, said lost motion connection permitting limited movement of said control link independently of said output member.

8. The combination of claim 7 wherein said lost motion connection includes a slot formed in said output member, a link disposed in said slot, one end of said slot engaging said control link to urge said output member and control link in said one direction when said wall is in said first position, the other end of said slot engaging said control link to resist movement of said output member and control link when said wall member is moved toward said second position.

* * * * *